US010878057B2

(12) United States Patent
Van Rotterdam (10) Patent No.: US 10,878,057 B2
(45) Date of Patent: Dec. 29, 2020

(54) WEB APPLICATION WITH CUSTOM FORM COMPONENTS

(71) Applicant: CITRIX SYSTEMS, INC., Fort Lauderdale, FL (US)

(72) Inventor: Jeroen Mattijs Van Rotterdam, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/266,188

(22) Filed: Feb. 4, 2019

(65) Prior Publication Data

US 2020/0250255 A1  Aug. 6, 2020

(51) Int. Cl.

| G06F 17/00 | (2019.01) |
| G06F 16/957 | (2019.01) |
| G06F 3/0484 | (2013.01) |
| G06F 16/955 | (2019.01) |
| G06F 3/0482 | (2013.01) |
| G06F 3/0483 | (2013.01) |

(52) U.S. Cl.
CPC ........ *G06F 16/9577* (2019.01); *G06F 3/0482* (2013.01); *G06F 3/0483* (2013.01); *G06F 3/04845* (2013.01); *G06F 16/955* (2019.01)

(58) Field of Classification Search
CPC .. G06F 16/9577; G06F 16/955; G06F 3/0482; G06F 3/0483; G06F 3/04845
USPC ................................................. 715/223, 225
See application file for complete search history.

(56) References Cited

U.S. PATENT DOCUMENTS

| 8,326,793 | B1 * | 12/2012 | Bowers | .................... G06F 9/50 |
| | | | | 706/62 |
| 9,176,744 | B2 | 11/2015 | Lee | |
| 9,436,763 | B1 * | 9/2016 | Gianos | ................. G06F 16/951 |
| 9,538,345 | B2 | 1/2017 | Sah et al. | |
| 10,732,993 | B2 * | 8/2020 | Mossman | ................. G06F 8/61 |
| 2004/0148568 | A1 * | 7/2004 | Springer | ............... G06F 16/957 |
| | | | | 715/205 |

(Continued)

OTHER PUBLICATIONS

Winkler et al., An Approach and Tool Support for Assisting Users to Fill-in Web Forms with Personal Information, ACM 2011, pp. 195-202. (Year: 2011).*

(Continued)

*Primary Examiner* — Cong-Lac Huynh
(74) *Attorney, Agent, or Firm* — Allen, Dyer, Doppelt + Gilchrist, PA (57) ABSTRACT

A computing system includes a web server to provide a web application, and an enterprise server to provide a library of custom form components to be used to customize web pages in the web application. Each custom form component corresponds to an existing form component on one of the web pages. A client computing device accesses the web application and the library of custom form components via an embedded browser, renders one of the web pages from the web application, and analyzes the rendered web page for existing form components. The existing form components in the rendered web page are compared to the library of custom form components for a match. For each match, the existing form component in the rendered web page is replaced with the matched custom form component from the library of custom form components. The web page with the custom form components is re-rendered for display.

20 Claims, 7 Drawing Sheets

(56) References Cited

U.S. PATENT DOCUMENTS

| | | | |
|---|---|---|---|
| 2008/0184100 A1* | 7/2008 | Selig | G06F 40/174 |
| | | | 715/225 |
| 2009/0106296 A1* | 4/2009 | Sickmiller | G06F 40/174 |
| 2010/0070924 A1* | 3/2010 | Hart, II | G06F 9/451 |
| | | | 715/829 |
| 2013/0103538 A1* | 4/2013 | Scholl | G06Q 30/0601 |
| | | | 705/26.7 |
| 2013/0132833 A1* | 5/2013 | White | G06F 3/048 |
| | | | 715/704 |
| 2017/0091163 A1* | 3/2017 | Lupien | H04L 67/2852 |
| 2017/0126653 A1* | 5/2017 | Lupien | H04L 63/083 |
| 2018/0089158 A1* | 3/2018 | Mehta | G06F 3/0237 |
| 2018/0349586 A1* | 12/2018 | Nowak | H04M 1/0202 |

OTHER PUBLICATIONS

Bolin et al., Automation and Customization of Rendered Web Pages, ACM 2005, pp. 163-172. (Year: 2005).*

* cited by examiner

WEB APPLICATION WITH CUSTOM FORM COMPONENTS

TECHNICAL FIELD

The present disclosure relates to web applications, and more particularly, to customizing a web application for an end user.

BACKGROUND

Software as a Service (SaaS) is a cloud computing approach to software delivery by which web applications are centrally hosted in the cloud and are typically provided on a subscription basis to users. SaaS web applications are offered for numerous areas, including business, accounting, and even gaming applications.

SaaS web applications are typically accessed on client computing devices via a browser. Most SaaS web applications have forms with validation rules by they lack enterprise specific validation rules and lack enterprise specific support capabilities.

SUMMARY

A computing system includes a web server to provide a web application, and an enterprise server to provide a library of custom form components to be used to customize web pages in the web application. Each custom form component corresponds to an existing form component on one of the web pages. The computing system includes at least one client computing device comprising a display, an embedded browser to access the web application and the library of custom form components, and a processor. The processor cooperates with the embedded browser to render one of the web pages from the web application, analyze the rendered web page for existing form components, and compare the existing form components in the rendered web page to the library of custom form components for a match. For each match, the existing form component in the rendered web page is replaced with the matched custom form component from the library of custom form components. The web page is re-rendered with the custom form components for display on the display.

The custom form components advantageously allow an administrator of the enterprise server, for example, to provide user specific support capabilities to end users accessing the web application without changing the web application itself. The custom form components are injected to replace existing form components on the fly to aid the end user or to customize the form for a specific enterprise. Enterprise specific support capabilities include, for example, custom helper functions, reduced drop down options, custom lookup capabilities and voice input support.

The processor analyzes a document object model (DOM) tree of the rendered web page to identify the existing form components. The existing form components and the custom form components each have an address in the DOM tree. A match between an existing form component and a custom form component is based on each having the same address.

Replacing existing form components with custom form components may also be based on injection points. Each existing form component in the rendered web page has a respective injection point associated therewith, wherein each custom form component in the library of custom form components has a respective injection point associated therewith. A match is based on one of the existing form components having the same injection point as one of the custom form components. Each injection point may correspond to an address in the DOM tree of the rendered web page.

The library of custom form components may include at least two custom form components matching the same existing form component, with one of the at least two custom form components being selected as a match based on a context or environmental parameters of the user operating the client computing device. The context of the user may correspond to a position of employment of the user, for example.

Each web page has an HTML format, and each custom form component also has an HTML format. The web application may be a Software as a Service (SaaS) application.

Another aspect is directed to a method for operating a client computing device within a computing system comprising a web server to provide a web application, and an enterprise server to provide a library of custom form components to be used to customize web pages in the web application. Each custom form component corresponds to an existing form component on one of the web pages. The method includes accessing the web application and the library of custom form components via the embedded browser, rendering one of the web pages from the web application, and analyzing the rendered web page for existing form components. The existing form components in the rendered web page are compared to the library of custom form components for a match. For each match, the existing form component in the rendered web page is replaced with the matched custom form component from the library of custom form components. The web page is re-rendered with the custom form components for display.

Yet another aspect is directed to a non-transitory computer readable medium for operating a client computing device as described above, and with the non-transitory computer readable medium having a plurality of computer executable instructions for causing the client computing device to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, solid-state storage devices, and/or any combination thereof.

Figure 1:
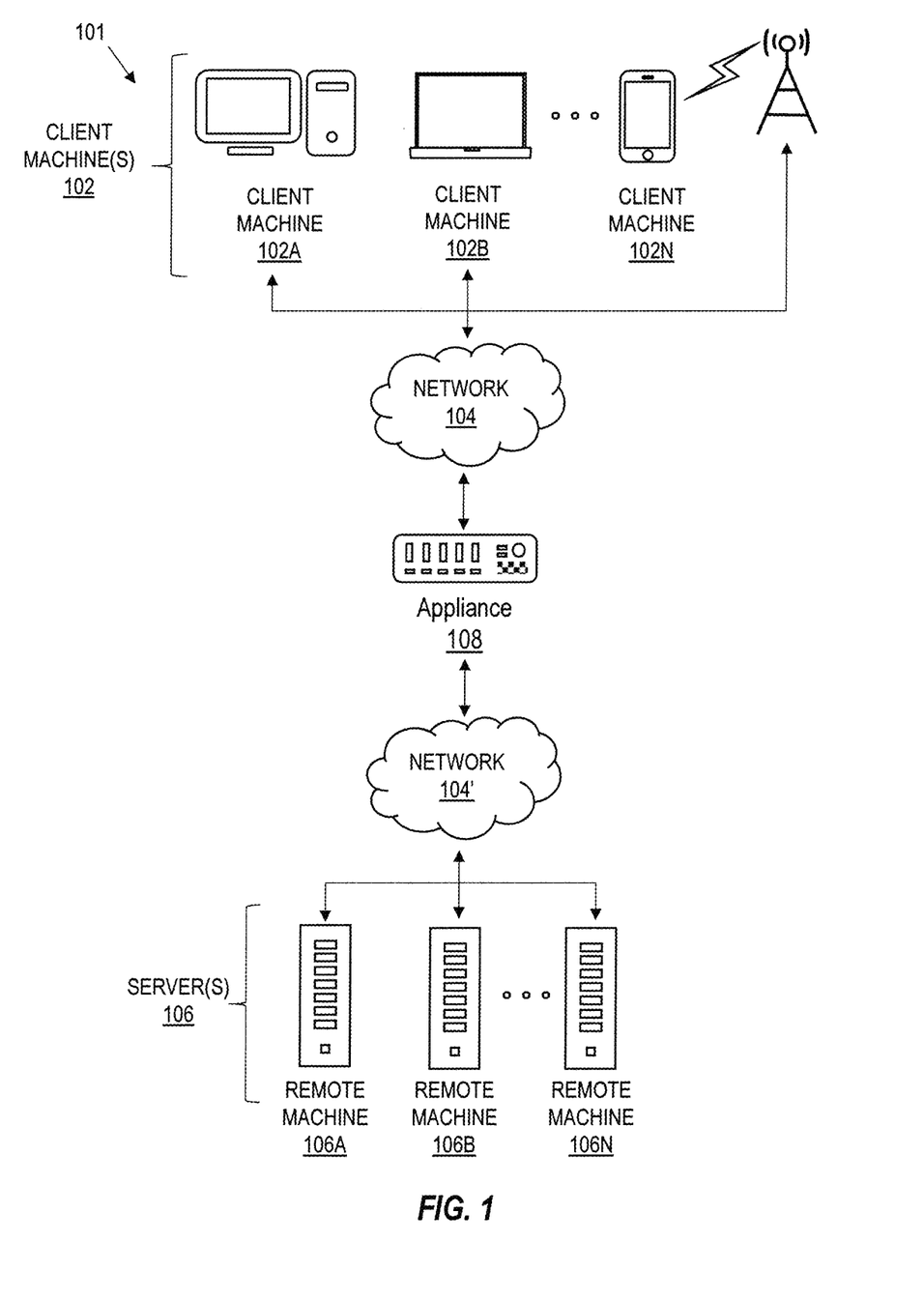
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer or Transport Layer Security Virtual Private Network (SSL/TLS VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
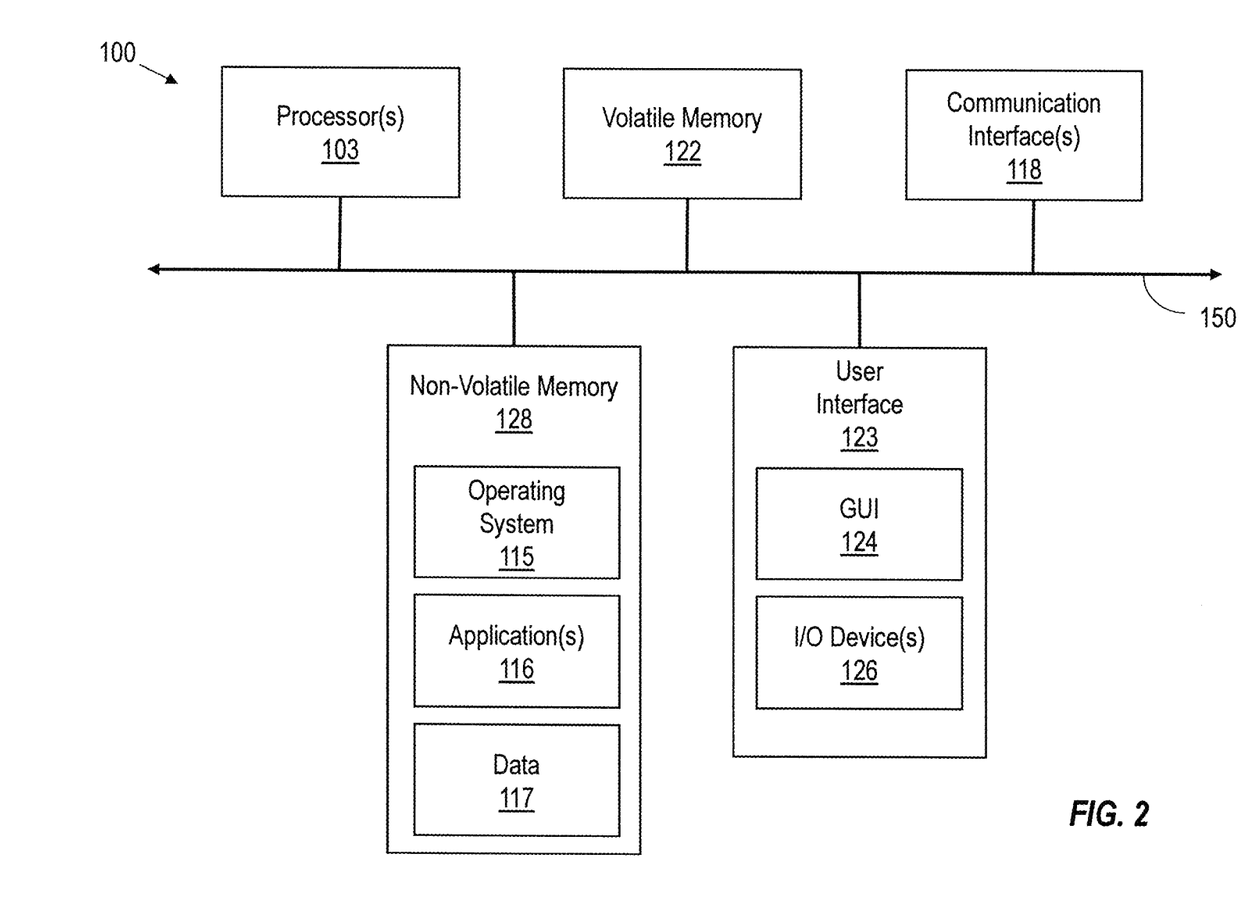
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
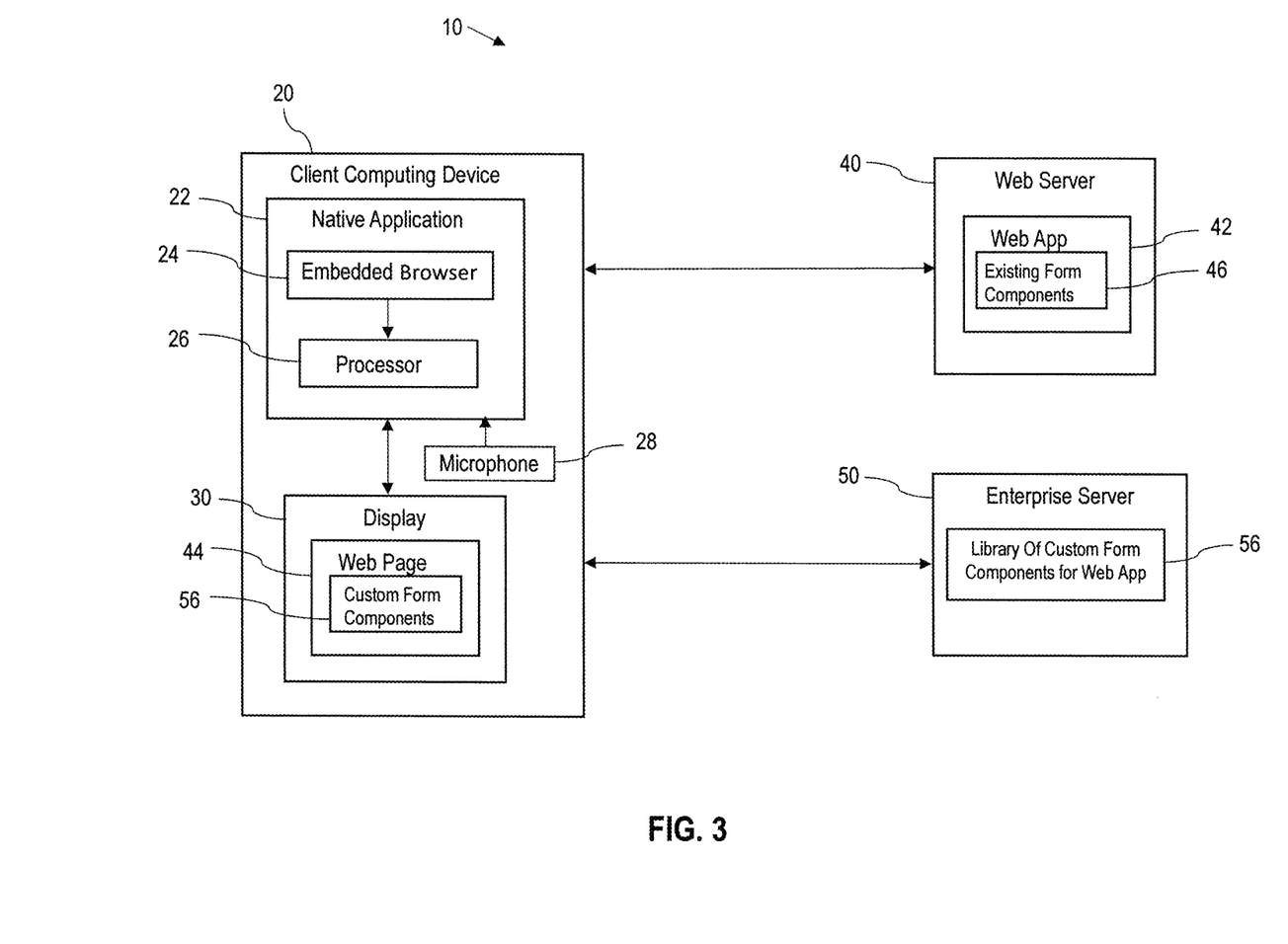
FIG. 3 is a block diagram of a computing system that includes a client computing device with an embedded browser that provides custom form components for a web application.

Referring initially to FIG. 3, the illustrated computing system 10 includes at least one client computing device 20, a web server 40 and an enterprise server 50. As will be discussed in detail below, existing form components 46 in a web page 44 as provided by the web server 40 may be replaced with custom form components 56 as provided by the enterprise server 50 before being displayed on the client computing device 20.

The custom form components 56 advantageously allow an administrator of the enterprise server 50 to provide user specific support capabilities to end users accessing a web application 42 without changing the web application 42 itself. The custom form components are injected to replace existing form components one the fly to aid the end user or to customize the form for a specific enterprise. Enterprise specific support capabilities include, for example, custom helper functions, reduced drop down options, custom lookup capabilities and voice input support.

The client computing device 20 is enrolled with the enterprise server 50. The enterprise server 50 includes a library of custom form components 56 used to customize web pages 44 in the web application 42. The library of custom form components 56 are generally defined and implemented by an administrator of the enterprise server 50. Each custom form component 56 corresponds to an existing form component 46 on one of the web pages 44 within the web application 42.

The enterprise server 50 may be a web server, as readily appreciated by those skilled in the art. Alternatively, the enterprise server 50 may be an enterprise access/security system. In this case, the enterprise server 50 may be a unified endpoint management (UEM) server, an enterprise mobility management (EMM) server, or a mobile device management (MDM) server, for example. Even though only one client computing device 20 is illustrated as being enrolled with the enterprise server 50, there is no limit to the number of devices that may be enrolled.

Generally speaking, the enterprise server 50 provides a platform for providing access by the client computing device 20 to shared applications 42. The shared applications 42 may be hosted/managed, Web, and SaaS applications. For discussion purposes, the application 42 is a web application.

The client computing device 20 includes an embedded browser 24 to access the web application 42 and the library of custom form components 56. The embedded browser 24 is a browser embedded within a native application 22. For example, Citrix Receiver and Citrix Workspace App are programs that are installed on client computing devices 20.

Since the embedded browser 24 is embedded within the native application 22 within the client computing device 20, this allows the web application 42 to be customized without modifying the web application 42 itself. Instead, logic outside of the embedded browser 24 allows the native application 22 to control a processor 26 so that certain existing form components 46 in the web application 42 are replaced with custom form components 56 before being displayed on a display 30 of the client computing device 20.

The processor 26 thus cooperates with the embedded browser 24 to render one of the web pages 44 from the web application 42, analyze the rendered web page for existing form components 46, and compare the existing form components 46 in the rendered web page 44 to the library of custom form components 56 for a match.

For each match, the processor 26 replaces the existing form component 46 in the rendered web page 44 with the matched custom form component 56 from the library of custom form components 56. The processor 26 then re-renders the web page 44 with the custom form components 56 on the display 30. The custom form components allow enterprise specific support capabilities to be provided, such as custom helper functions, reduced drop down options, custom lookup capabilities and voice input support, for example.

When the processor 26 initially renders a web page 44 from the web application 42, it is not displayed. This allows the processor 26 to determine a document object model (DOM) of the rendered web page 44. The processor 26 analyzes a DOM tree of the rendered web page 44 to identify the existing form components 46.

Figure 4:
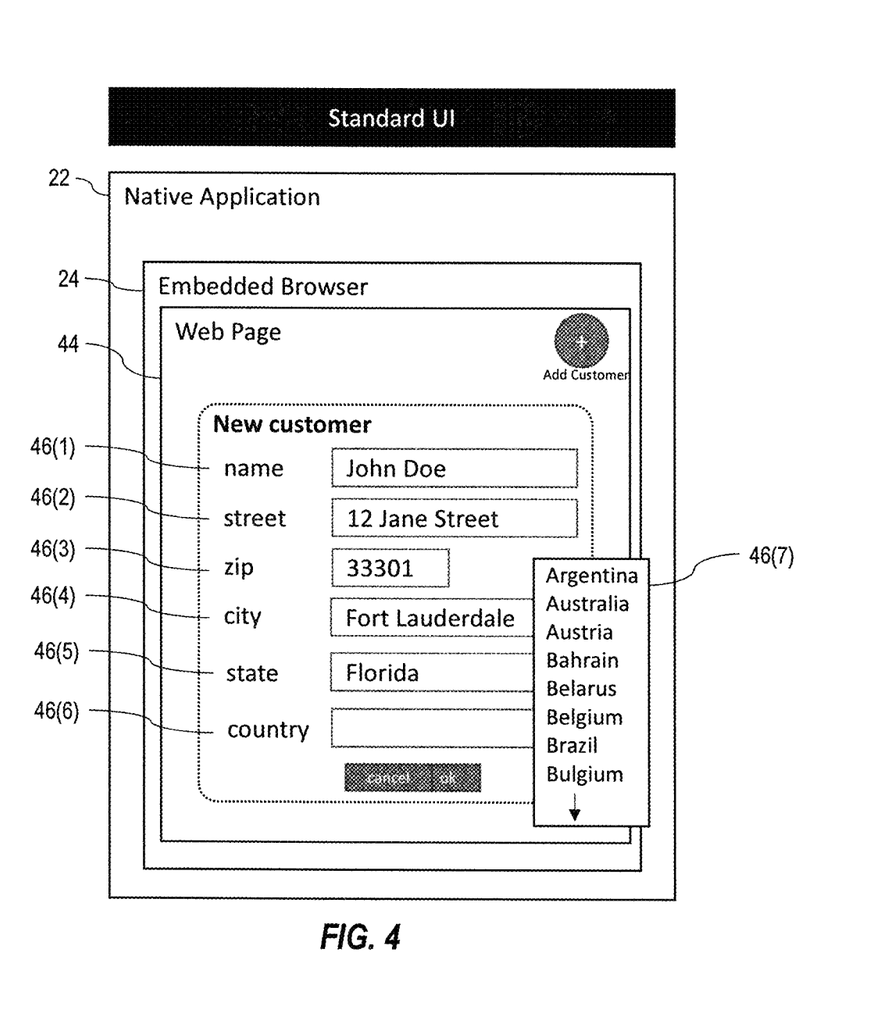
FIG. 4 is an example screen shot of a web page with existing form components for the web application illustrated in FIG. 3.

For illustration purposes, the existing form components 46 in the web page 44 provided in FIG. 4 include existing form components 46(1)-46(7). The existing form components 46(1)-46(7) are from an example web application 42 directed to customer relationship management (CRM) which focuses on sales and support. CRM is a major component of the Salesforce platform provided by Salesforce.com, Inc., for example.

The existing form components 46(1)-46(5) allow a user to enter data on a new customer into the Salesforce application 42. The data is manually entered by the user in existing form fields 46(1)-46(5). When the user is ready to enter the country of residence for the new customer in existing form component 46(6), a drop down menu 46(7) of all the available countries for the user to choose from appears. Scrolling through such a large list countries can be burdensome on the user, particularly when the user only needs to choose from a limited number of countries.

Figure 5:
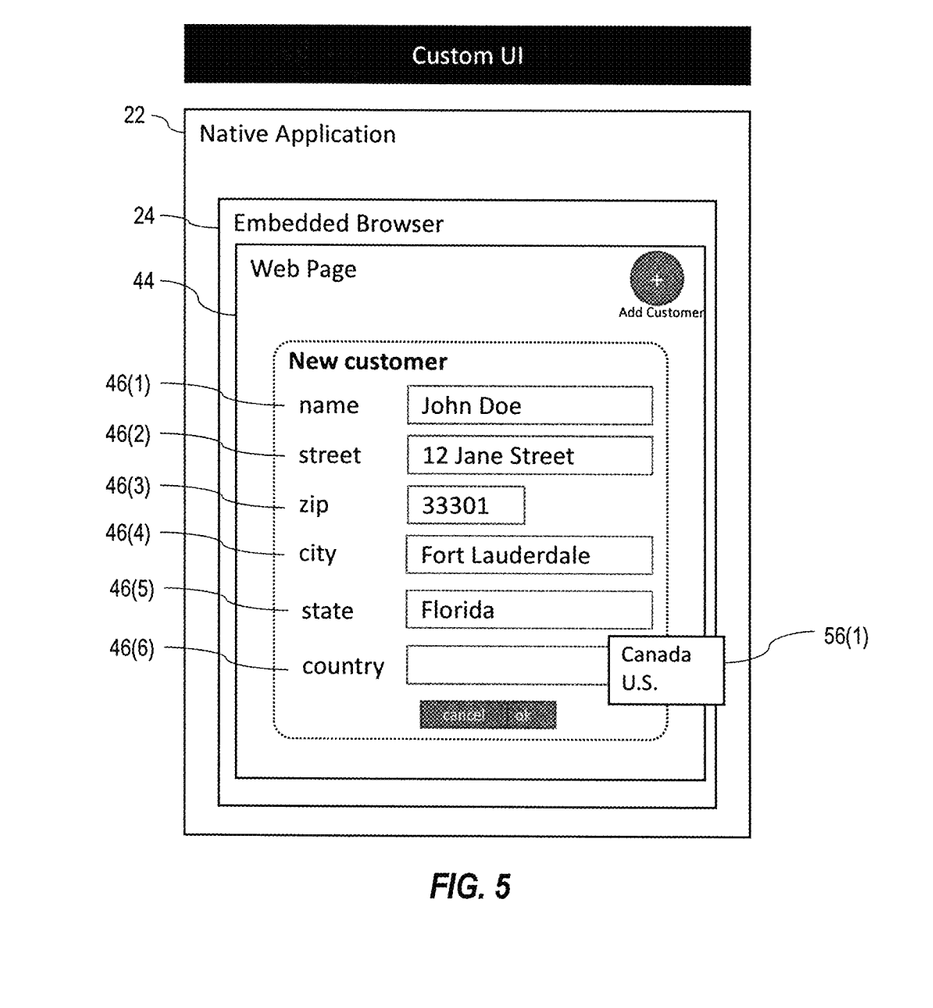
FIG. 5 is an example screen shot of the web page illustrated in FIG. 4 with one of the existing form components replaced with a custom form component.

For discussion purposes, the user's employer only operates in Canada and the U.S. Referring now to FIG. 5, the drop down menu 46(7) is replaced with a custom form component 56(1) that provides a drop down menu with a reduced listing of countries. The reduced list of available country options allows the user to quickly enter the appropriate country.

As noted above, the processor 26 analyzes a DOM tree of the rendered web page 44 to identify the existing form components 46(1)-46(7). Each rendered web page 44 in the web application 42 has an HTML format, and each custom form component 56 likewise has an HTML format.

Each existing form component 46 has an identifier associated therewith. The identifier may be an element ID or xPath, for example. An element ID or xPath provides a unique path to a particular existing form component 46 in the DOM tree. In the illustrated example, the processor 26 compares the existing form components 46(1)-46(7) in the rendered web page 44 to the library of custom form components 56 for a match.

A match between the existing form components 46(1)-46(7) and a custom form component 56 is based on one of the custom form components 56 having the same element ID or xPath as one of the existing form components. In the illustrated example, the unique path for custom form component 56(1) is the same as the unique path for existing form component 46(7). The processor 26 is configured to replace the existing form component 46(7) in the rendered web page 44 with the matched custom form component 56(1) from the library of custom form components 56. The processor 26 re-renders the web page 44 with the custom form component 56(1) for display.

Replacing existing form components 46 with custom form components 56 may also be based on injection points. Injection points provide unique paths to existing form components 46 in the DOM tree. Each existing form component 46(1)-46(7) in the rendered web page 44 has a respective injection point associated therewith, and each custom form component 56 in the library of custom form components 56 has a respective injection point associated therewith. In the above example, a match is based on existing form component 46(7) having the same injection point as custom form components 56(1). Injection points correspond to addresses in the DOM tree of the rendered web page 44.

The computing system 10 advantageously allows existing form components 46 of a web application 42 to be overridden with custom form components 56 without the need to change the web application 42. Customizing of the web application 42 with the custom form components 56 is performed on the fly by the client computing device 20.

The custom form components 56 advantageously allow an administrator of the enterprise server 50 to provide user specific support capabilities to end users accessing a web application 42 without changing the web application 42 itself. The custom form components 56 thus allow a specific enterprise to customize existing form components 46.

Typically, web applications 42 have forms with validation rules, for example, but they lack enterprise specific validation rules and lack enterprise specific support capabilities, such as custom helper functions, reduced drop down options (see FIG. 5), custom lookup capabilities and voice input support. The custom form components 56 are able to provide these customizable features to existing web applications 42.

In terms of validation rules associated with a web application 42, an example is determining the validity of a U.S. zip code entered by a user. Based on the web application 42, the entered zip code would be compared to a database of U.S. zip codes. However, if the user's employer only operates in Florida, for example, then a custom form component 56 can be provided that only checks the entered zip code with available Florida zip codes.

As example capabilities that may be provided, additional validation rules for form fields may be triggered by the lost-focus event of a form. The validation rules may be defined using regular expressions. There may be reduced drop down options for specific combo boxes or radio buttons, as illustrated in the above example. Custom lookup capabilities may be provided where an overlay dialog is presented through an external lookup where the value is populated into the form field after a selection is made.

Another example is to provide voice input support for populating fields. In this example, the web application 42 does not support voice input. This means that the user types in the data to be entered. However, a custom form component 56 may be provided to enable voice input for the web application 42 using a microphone 28 carried by the client computing device 20. When the user speaks into the microphone 28 with the voice input enabled, data is then entered into the corresponding dialog.

As noted above, a controlled browser environment will maintain a library of custom form components 56 for a given form, collect environment variables to determine the context, load the page without customizations first, determine which context applies for a given set of environment variables, select the set of form components to override, determine the injection point for each form component, and change the DOM to remove the existing form component and inject the override custom form component.

The use of custom form components 56 is to the benefit of the user. However, different users may have different responsibilities within an enterprise. This context may be taken into consideration such that different customizations may be provided within an enterprise. For instance, a user in accounting may require a different customization as compared to a user in engineering.

In other words, there may be multiple classes of customizations within an enterprise. The library of custom form components 56 may include at least two custom form components 56 matching the same existing form component 46, with one of the at least two custom form components 56 being selected as a match based on a context of the user operating the client computing device 20. When there are multiple custom form components 56 matching an existing form component 46, one of the custom form components will be marked as a default in case a determination cannot be made on which custom form component to provide based on the context or environmental parameters of the user.

Figure 6:
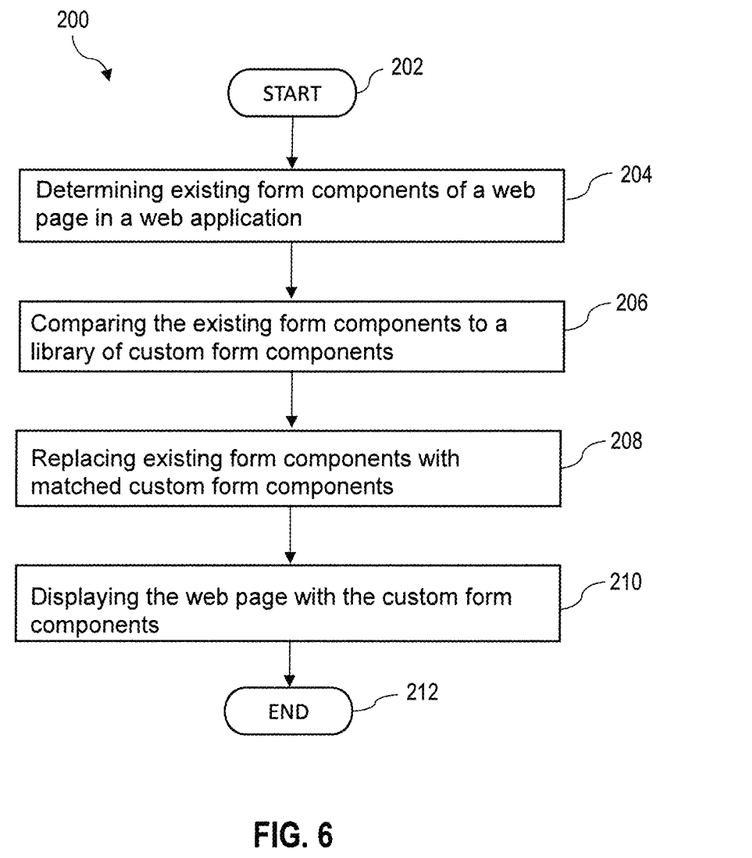
FIG. 6 is a general flowchart illustrating a method for operating the client computing device illustrated in FIG. 3.

Referring now to the flowchart 200 in FIG. 6, and generally speaking, a method for operating a client computing device will be discussed. From the start (Block 202), the method includes determining existing form components 46 of a web page 44 in a web application 42 at Block 204, and comparing the existing form components 46 to a library of custom form components 56 at Block 206. Existing form components 46 are replaced with matched custom form components 56 at Block 208, and the web page 44 with the custom form components 56 is displayed at Block 210. The method ends at Block 212.

Figure 7:
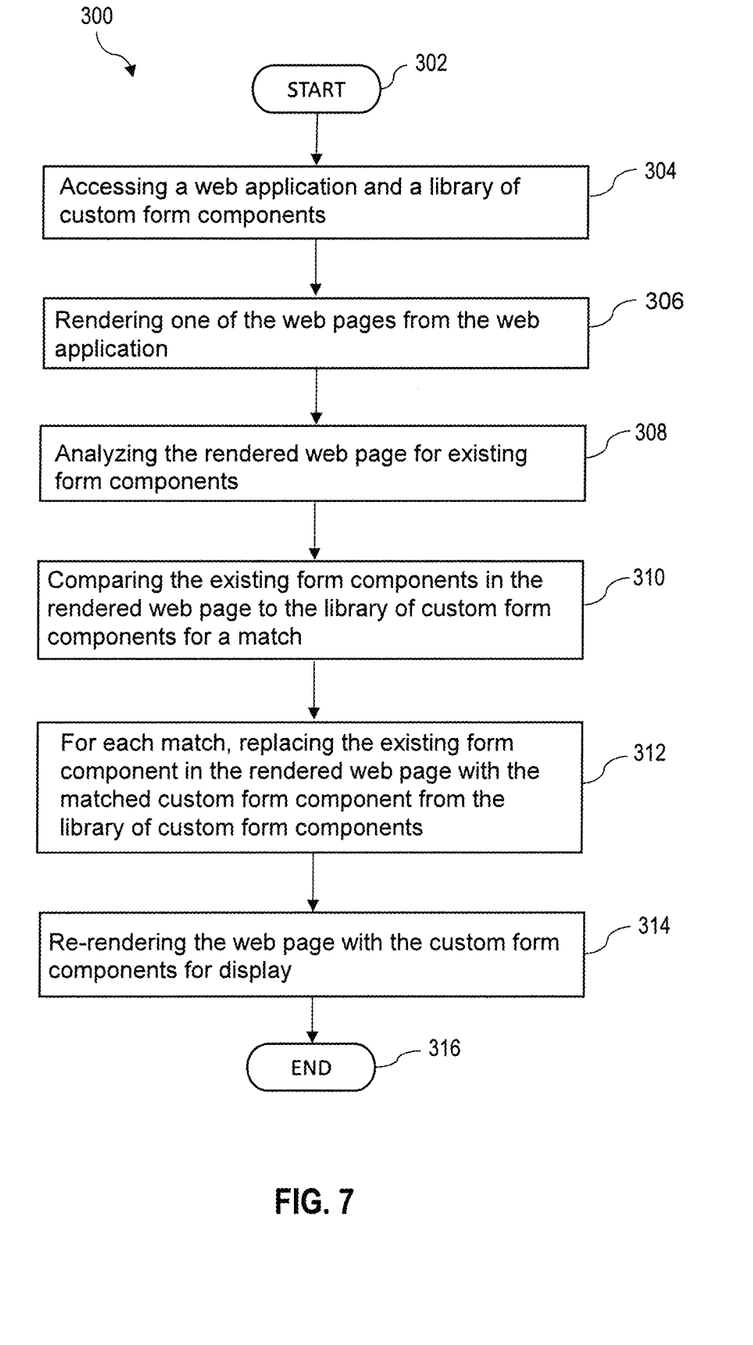
FIG. 7 is a more detailed flowchart illustrating a method for operating the client computing device illustrated in FIG. 3.

Referring now to the flowchart 300 in FIG. 7, more detailed steps for operating the client computing device 20 will be discussed. From the start (Block 302), the method includes accessing the web application 42 and the library of custom form components 56 via the embedded browser 24 at Block 304, rendering one of the web pages 44 from the web application 42 at Block 306, and analyzing the rendered web page 44 for existing form components 46 at Block 308. The method further includes comparing the existing form components 46 in the rendered web page 44 to the library of custom form components 56 for a match at Block 310. For each match, the existing form component 46 in the rendered web page 44 is replaced with the matched custom form component 56 from the library of custom form components 56 at Block 312. The web page 44 is re-rendered with the custom form components 56 for display at Block 314. The method ends at Block 316.

Another aspect is directed to a non-transitory computer readable medium for operating a client computing device 20 comprising a display 30, an embedded browser 22 and a processor 24, and with the non-transitory computer readable medium having a plurality of computer executable instructions for causing the client computing device to perform steps that includes operating the embedded browser 22 to access a web application 52 that requires data to be entered by a user, and operate the processor 24 to cooperate with the embedded browser 22 to display a web page 32 from the web application 52. The web page 32 includes a form 34 requiring data to be entered by the user. The form 34 is analyzed to generate an overlay 36, with the overlay 36 being separate from the web application 52. The overlay 36 is displayed over the form 34 to assist with the user entering the required data. The data entered by the user into the overlay 36 is collected, and the form 34 on the displayed web page 32 is populated based on the collected data.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A computing system comprising:
a web server to provide a web application;
an enterprise server to provide a library of custom form components to be used to customize web pages in the web application, with each custom form component corresponding to an existing form component on one of the web pages; and
a client computing device comprising:
a display,
an embedded browser to access the web application and the library of custom form components, and
a processor cooperating with the embedded browser to perform the following:
render one of the web pages from the web application,
analyze the rendered web page for existing form components,
compare the existing form components in the rendered web page to the library of custom form components for a match,
for each match, replace the existing form component in the rendered web page with the matched custom form component from the library of custom form components, and
re-render the web page with the custom form components for display on said display.

2. The computing system according to claim 1 wherein said processor analyzes a document object model (DOM) tree of the rendered web page to identify the existing form components.

3. The computing system according to claim 2 wherein the existing form components and the custom form components each have an address in the DOM tree.

4. The computing system according to claim 3 wherein a match between an existing form component and a custom form component is based on each having the same address.

5. The computing system according to claim 1 wherein each existing form component in the rendered web page has a respective injection point associated therewith, wherein each custom form component in the library of custom form components has a respective injection point associated therewith, and wherein a match is based on one of the existing form components having the same injection point as one of the custom form components.

6. The computing system according to claim 5 wherein each injection point corresponds to an address in a document object model (DOM) tree of the rendered web page.

7. The computing system according to claim 1 wherein the library of custom form components includes at least two custom form components matching the same existing form component, with one of the at least two custom form components being selected as a match based on a context of the user operating said client computing device.

8. The computing system according to claim 7 wherein the context of the user corresponds to an employment classification of the user.

9. The computing system according to claim 1 wherein each web page has an HTML format, and wherein each custom form component has an HTML format.

10. The computing system according to claim 1 wherein the web application comprises a Software as a Service (SaaS) application.

11. A method for operating a client computing device within a computing system comprising a web server to provide a web application, and an enterprise server to provide a library of custom form components to be used to customize web pages in the web application, with each custom form component corresponding to an existing form component on one of the web pages, the method comprising:

accessing the web application and the library of custom form components via the embedded browser;
rendering one of the web pages from the web application;
analyzing the rendered web page for existing form components;
comparing the existing form components in the rendered web page to the library of custom form components for a match;
for each match, replacing the existing form component in the rendered web page with the matched custom form component from the library of custom form components; and
re-rendering the web page with the custom form components for display.

12. The method according to claim 11 wherein the processor analyzes a document object model (DOM) tree of the rendered web page to identify the existing form components.

13. The method according to claim 12 wherein the existing form components and the custom form components each have an address in the DOM tree.

14. The method according to claim 13 wherein a match between an existing form component and a custom form component is based on each having the same address.

15. The method according to claim 11 wherein the library of custom form components includes at least two custom form components matching the same existing form component, with one of the at least two custom form components being selected as a match based on a context of the user operating the client computing device.

16. The method according to claim 15 wherein the context of the user corresponds to an employment classification of the user.

17. A non-transitory computer readable medium for operating a client computing device within a computing system comprising a web server to provide a web application, and an enterprise server to provide a library of custom form components to be used to customize web pages in the web application, with each custom form component corresponding to an existing form component on one of the web pages, and with the non-transitory computer readable medium having a plurality of computer executable instructions for causing the client computing device to perform steps comprising:
accessing the web application and the library of custom form components via the embedded browser;
rendering one of the web pages from the web application;
analyzing the rendered web page for existing form components;
comparing the existing form components in the rendered web page to the library of custom form components for a match;
for each match, replacing the existing form component in the rendered web page with the matched custom form component from the library of custom form components; and
re-rendering the web page with the custom form components for display.

18. The non-transitory computer readable medium according to claim 17 wherein the processor analyzes a document object model (DOM) tree of the rendered web page to identify the existing form components.

19. The non-transitory computer readable medium according to claim 18 wherein the existing form components and the custom form components each have an address in the DOM tree.

20. The non-transitory computer readable medium according to claim 19 wherein a match between an existing form component and a custom form component is based on each having the same address.

* * * * *